United States Patent
Tsujiuchi et al.

(10) Patent No.: US 10,300,643 B2
(45) Date of Patent: May 28, 2019

(54) MANUFACTURE METHOD OF LIQUID SUPPLY MEMBER AND MANUFACTURE APPARATUS

(71) Applicant: CANON KABUSHIKI KAISHA, Tokyo (JP)

(72) Inventors: Naoko Tsujiuchi, Kawasaki (JP); Yukuo Yamaguchi, Tokyo (JP); Mikiya Umeyama, Tokyo (JP); Satoshi Oikawa, Yokohama (JP); Hiromasa Amma, Kawasaki (JP); Takuya Iwano, Inagi (JP); Satoshi Kimura, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 358 days.

(21) Appl. No.: 15/157,909

(22) Filed: May 18, 2016

(65) Prior Publication Data

US 2016/0346976 A1   Dec. 1, 2016

(30) Foreign Application Priority Data

May 25, 2015   (JP) .................................. 2015-105103
Mar. 25, 2016   (JP) .................................. 2016-061821

(51) Int. Cl.
*B28B 7/22* (2006.01)
*B29C 45/16* (2006.01)
(Continued)

(52) U.S. Cl.
CPC ...... *B29C 45/1657* (2013.01); *B29C 45/0062* (2013.01); *B29C 45/0416* (2013.01); *B29C 45/1635* (2013.01); *B29C 45/1643* (2013.01); *B29C 45/33* (2013.01); *B41J 2/1752* (2013.01); *B41J 2/1753* (2013.01);
(Continued)

(58) Field of Classification Search
CPC ................ B29C 45/0062; B29C 45/33; B29C 2045/0063; B29L 2031/7678; B41J 2/1753

See application file for complete search history.

(56) References Cited

U.S. PATENT DOCUMENTS 5,969,738 A   10/1999 Tomikawa et al.
8,388,114 B2   3/2013 Yamaguchi et al.
(Continued)

FOREIGN PATENT DOCUMENTS

CN   102785475 A   11/2012
CN   102814913 A   12/2012
(Continued)

OTHER PUBLICATIONS

First Office Action in Chinese Application No. 201610349530.6 (dated Nov. 3, 2017).
(Continued)

*Primary Examiner* — William P Bell
*Assistant Examiner* — Andrew L Swanson
(74) *Attorney, Agent, or Firm* — Venable LLP

(57) ABSTRACT

First and second constituting components are injection-molded and joined within one pair of molds. In order to join the first and second constituting components, one of the respective regions of the first and second constituting components abutted to each other is pushed into the other.

9 Claims, 9 Drawing Sheets

(51) Int. Cl.
  *B29C 45/33*   (2006.01)
  *B29C 45/04*   (2006.01)
  *B29C 45/00*   (2006.01)
  *B41J 2/175*   (2006.01)
  *B29C 45/26*   (2006.01)
  *B29K 105/00*  (2006.01)
  *B29L 31/00*   (2006.01)

(52) U.S. Cl.
  CPC .......... *B29C 2045/0063* (2013.01); *B29C 2045/1623* (2013.01); *B29C 2045/1637* (2013.01); *B29C 2045/2683* (2013.01); *B29K 2105/0067* (2013.01); *B29L 2031/767* (2013.01); *B29L 2031/7678* (2013.01)

(56) References Cited

U.S. PATENT DOCUMENTS

| | | | |
|---|---|---|---|
| 8,801,156 | B2 | 8/2014 | Shimamura et al. |
| 9,764,554 | B2 | 9/2017 | Amma et al. |
| 2010/0171798 | A1* | 7/2010 | Yamaguchi .......... B41J 2/16532 347/85 |
| 2012/0293588 | A1 | 11/2012 | Shimamura et al. |
| 2012/0306972 | A1 | 12/2012 | Yokota et al. |
| 2016/0346967 | A1 | 12/2016 | Oikawa et al. |
| 2016/0346968 | A1 | 12/2016 | Kimura et al. |
| 2016/0346969 | A1 | 12/2016 | Toda et al. |
| 2016/0346970 | A1 | 12/2016 | Oikawa et al. |
| 2016/0346971 | A1 | 12/2016 | Iwano et al. |
| 2016/0347072 | A1 | 12/2016 | Iwano et al. |

FOREIGN PATENT DOCUMENTS

| | | |
|---|---|---|
| JP | 62-087315 A | 4/1987 |
| JP | 9-183230 A | 7/1997 |
| JP | 2002-178538 A | 6/2002 |
| JP | 2002-337183 A | 11/2002 |
| JP | 2010-158806 A | 7/2010 |

OTHER PUBLICATIONS

Extended European Search Report in European Application No. 16000983.3 (dated Nov. 8, 2016).
Amma et al., U.S. Appl. No. 15/156,583, filed May 17, 2016.
Oikawa et al., U.S. Appl. No. 15/151,880, filed May 11, 2016.
Iwano et al., U.S. Appl. No. 15/156,649, filed May 17, 2016.
Iwano et al., U.S. Appl. No. 15/156,578, filed May 17, 2016.
Kimura et al., U.S. Appl. No. 15/156,569, filed May 17, 2016.
Oikawa et al., U.S. Appl. No. 15/157,890, filed May 18, 2016.
Toda et al., U.S. Appl. No. 15/156,559, filed May 17, 2016.
Notification of Reason for Refusal in Korean Application No. 10-2016-0059942 (dated Mar. 4, 2019).

* cited by examiner

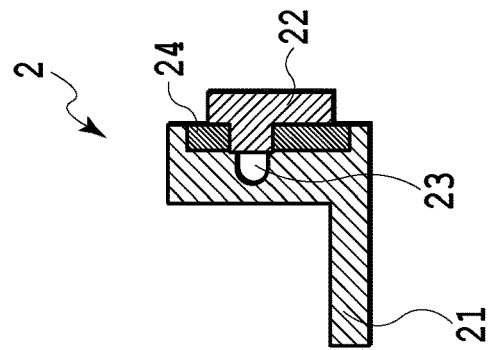
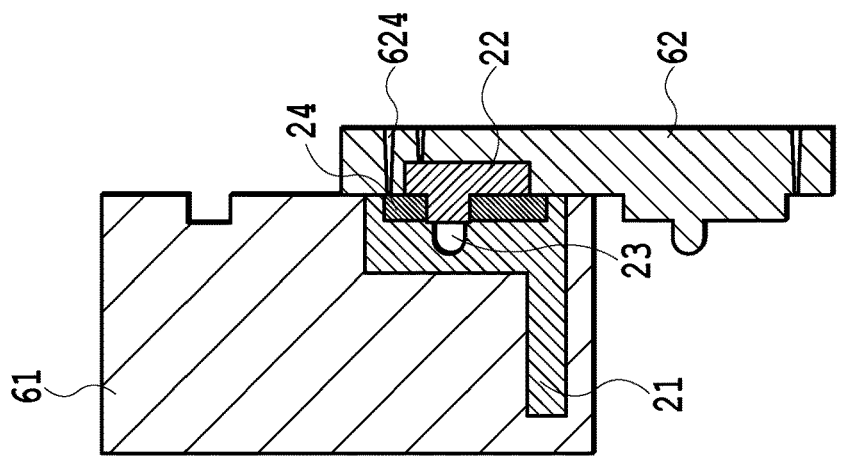
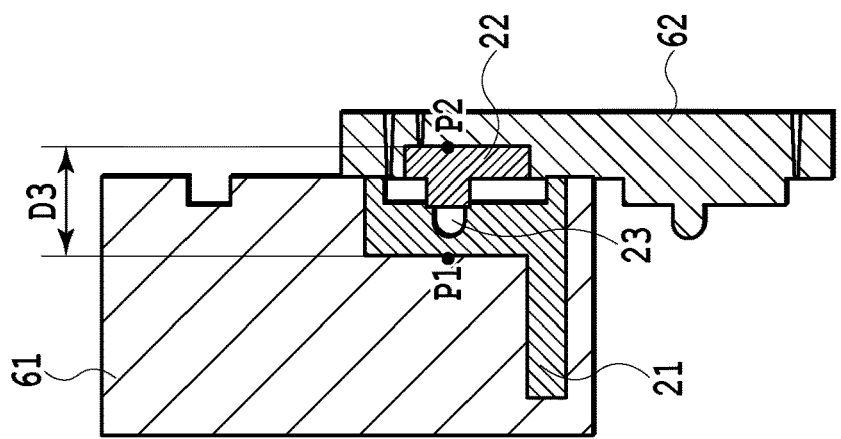

MANUFACTURE METHOD OF LIQUID SUPPLY MEMBER AND MANUFACTURE APPARATUS

BACKGROUND OF THE INVENTION

Field of the Invention

The present invention relates to a manufacture method of a liquid supply member including therein a liquid supply path and a manufacture apparatus.

Description of the Related Art

This type of liquid supply member is provided, for example, in a liquid ejection head that can eject liquid, supplied from a liquid container, through an ejection portion. The liquid supply member includes therein a liquid supply path between the liquid container and the ejection unit. The liquid ejection head may be an inkjet print head that can eject ink, supplied from an ink tank (liquid container), through a plurality of ejection openings (ejection portion). A print head that can eject a plurality of types of inks includes an ink supply member (liquid supply member) including a plurality of ink supply paths (liquid supply paths) corresponding to the respective inks.

Generally, the liquid supply member having a liquid supply path as described above are configured, from the viewpoint of easy manufacturing, light weight, and corrosion resistance, by the combination of a plurality of components obtained by subjecting resin material to injection molding. For example, the plurality of components are individually subjected to injection molding and are subsequently assembled by the adhesion by ultrasonic welding or adhesive material for example.

However, when the plurality of components individually subjected to injection molding are assembled by welding or adhesion for example, the dimensional accuracy among the plurality of components may be compromised. The reason is that the dimensional accuracy of the liquid supply members after the assembly is influenced by the molding accuracy and joint accuracy of these components for example.

SUMMARY OF THE INVENTION

The present invention provides a manufacture method and a manufacture apparatus by which a liquid supply member having a high dimensional accuracy can be manufactured while securing the shape of a liquid supply path suitable for stable liquid supply.

In the first aspect of the present invention, there is provided a manufacture method of a liquid supply member configured by a plurality of constituting components including first and second constituting components for forming a liquid supply path between the first constituting component and the second constituting component, comprising:
  a first step of injection-molding the first constituting component between a first position of a first mold and a first position of a second mold and injection-molding the second constituting component between a second position of the first mold and a second position of the second mold;
  a second step of opening the first mold and the second mold so that the first position of the first mold has the first constituting component and the second position of the second mold has the second constituting component to subsequently move the first mold relative to the second mold so that the first constituting component is opposed to the second constituting component;
  a third step of closing the first mold and the second mold so that a first region surrounding a part in which the liquid supply path is formed in the first constituting component and a second region surrounding a part in which the liquid supply path is formed in the second constituting component are abutted to each other; and
  a fourth step of allowing molten resin to flow to the outer side of the first and second regions,
  wherein in the third step, one of the first region and the second region is pushed to the other when the first mold and the second mold are closed.

In the second aspect of the present invention, there is provided a manufacture apparatus of a liquid supply member configured by a plurality of constituting components including first and second constituting components for forming a liquid supply path between the first constituting component and the second constituting component, comprising:
  a first mold and a first position of a second mold,
  a molding unit of injection-molding the first constituting component between a first position of the first mold and a first position of the second mold and injection-molding the second constituting component between a second position of the first mold and a second position of the second mold;
  a moving unit of opening the first mold and the second mold so that the first position of the first mold has the first constituting component and the second position of the second mold has the second constituting component to subsequently move the first mold relative to the second mold so that the first constituting component is opposed to the second constituting component;
  a mold-closing unit of closing the first mold and the second mold so that a first region surrounding a part in which the liquid supply path is formed in the first constituting component and a second region surrounding a part in which the liquid supply path is formed in the second constituting component are abutted to each other; and
  a unit of allowing molten resin to flow to the outer side of the first and second regions,
  wherein the mold-closing unit pushes one of the first region and the second region to the other when the first mold and the second mold are closed.

In the third aspect of the present invention, there is provided a manufacture method of a liquid supply member configured by a plurality of constituting components including first and second constituting components for forming a liquid supply path between the first constituting component and the second constituting component, comprising:
  a step of using a pair of a first mold and a second mold to injection-mold the first and second constituting components to subsequently move the first and second molds relative to each other so as to be opposed to the first and second constituting components and closing the first mold and the second mold so that a first region surrounding a part at which the liquid supply path is formed in the first constituting component is abutted to a second region surrounding a part at which the liquid supply path is formed in the second constituting component to subsequently allow molten resin to flow to outer sides of the first and second regions to join the first and second constituting components, wherein
  when the first and second molds are closed, one of the first region and the second region is pushed into the other.

According to the present invention, first and second constituting components are injection-molded and joined within one mold. Thus, a liquid supply member having a high dimensional accuracy can be manufactured.

Furthermore, the first and second constituting components can be joined so that the respective regions of the first and second constituting components abutted to each other are pushed to each other, thereby securely allowing these regions to be abutted to each other. For example, even when these regions include a sink mark or warpage for example, these regions can be securely abutted to each other over the entire face. This consequently allows, when molten resin is allowed to flow to the outer side of these regions, the molten resin can be suppressed from flowing to a part forming the liquid supply path, thereby securing the shape of the liquid supply path suitable for the stable liquid supply.

Further features of the present invention will become apparent from the following description of exemplary embodiments (with reference to the attached drawings).

BRIEF DESCRIPTION OF THE DRAWINGS

FIG. 3A, FIG. 3B, and FIG. 3C are schematic cross-sectional views of the main part illustrating the print head of FIG. 1A in the manufacture stage, respectively;

DESCRIPTION OF THE EMBODIMENTS

Figure 1A:
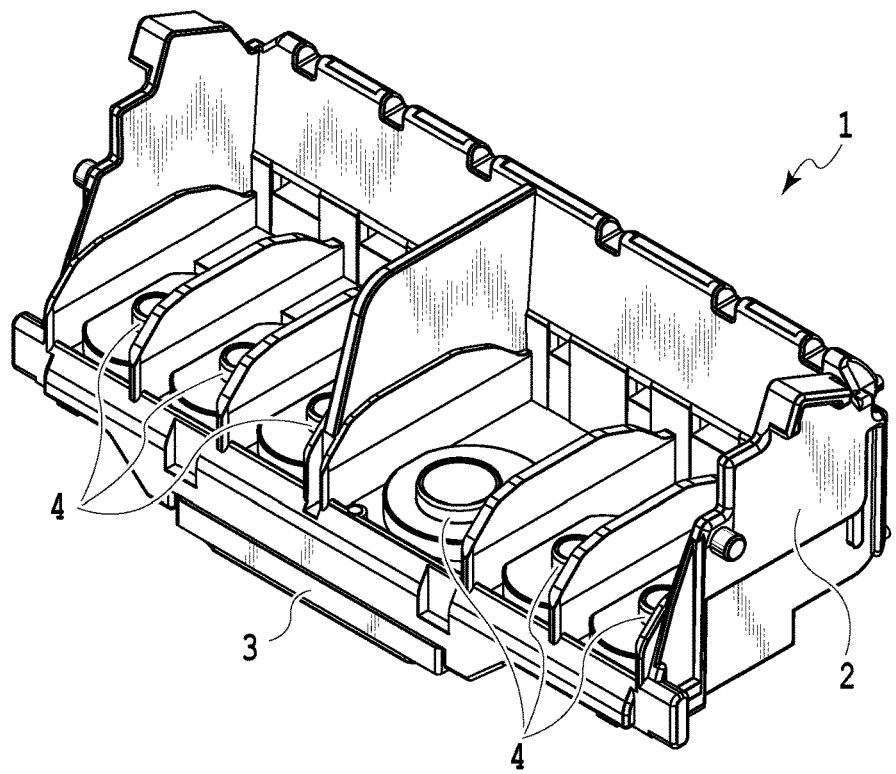
FIG. 1A and FIG. 1B are perspective views illustrating a print head of the first embodiment of the present invention, respectively.

First, prior to the description of an embodiment of the present invention, the following section will describe a manufacture method of a hollow structure including therein a hollow unit that can injection-mold and join a plurality of components within a mold (die slide injection molding). The manufacture method as described above is disclosed, for example, in Japanese Patent Laid-Open No. 2002-178538.

In the manufacture method as described above, at a dislocated position within a pair of molds (a fixed-side mold and a movable-side mold), two components constituting the hollow structure (e.g., one is a component having an opening unit and the other is a component covering the opening unit) are injection-molded, respectively (primary molding), and the molds are subsequently opened. During this, one of the two components is allowed to remain in the fixed-side mold and the other is allowed to remain in the movable-side mold.

Next, one of these molds is slid so that the one component remaining in the fixed-side mold and the other component remaining in the movable-side mold are opposite to one another and then these molds are closed. At this point of time, the two components are abutted to each other to form a hollow structure but are not joined. Thereafter, molten resin is allowed to flow to the abutted part (secondary molding) to adhere these components to thereby form the hollow structure.

If a liquid supply member including therein a liquid supply path is manufactured using such a manufacture method, a plurality of components constituting the liquid supply member can be molded and joined within one mold to thereby retain the joint accuracy of a plurality of components approximately within the size of one component. However, during the secondary molding, faces of the two components abutted to each other may locally include a not-abutted part due to the influence by a sink mark or warpage for example caused when they are separated from the mold after the primary molding. When such a not-abutted part is caused, secondary molding molten resin is caused to flow through this part into a space in which the liquid supply path is formed, thus causing a risk where the shape of the liquid supply path suitable for stable liquid supply cannot be secured or the liquid supply path is blocked. In particular, in the case of an ink supply member included in an inkjet print head, ink supply paths are densely configured in order to provide a print head having a smaller size. Thus, a region (flow path) in which the secondary molding molten resin flows is also narrowed, thus requiring the pressure of the secondary molding molten resin to be increased so that the molten resin can be flowed into the narrow region between these ink supply paths. Thus, the molten resin particularly tends to flow. When the flowing of such molten resin causes a part having a different shape to be formed in the ink supply path, a risk is caused in which the growth of bubbles in the ink supply path is started from the part and the bubbles remain and ink cannot be sufficiently supplied. Such a influence is high.

The present invention has been made based on the founding as described above.

The following section will describe embodiments of the present invention with reference to the drawings. A liquid supply member in the following embodiment is an application example as an ink supply member included in an inkjet print head.

[First Embodiment]

Figure 1B:
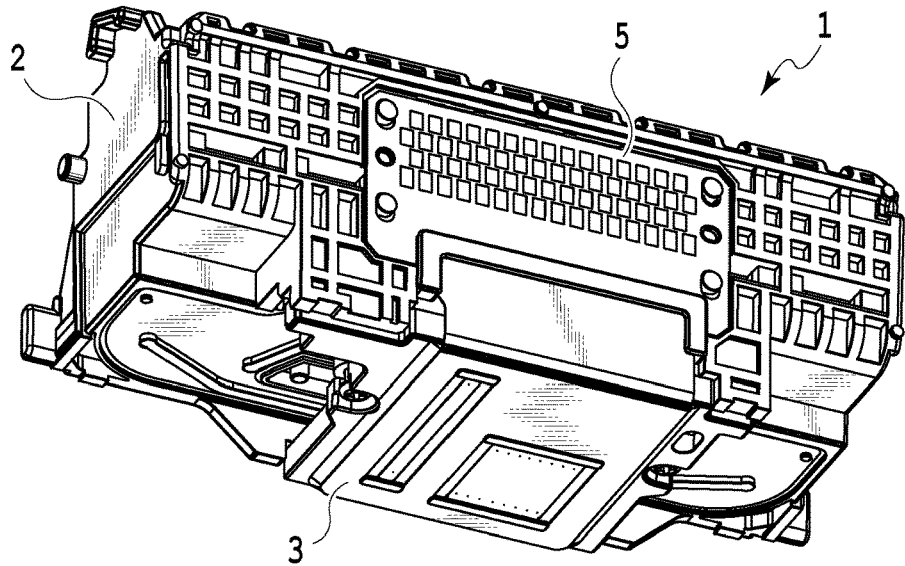

FIG. 1A and FIG. 1B are perspective views illustrating an inkjet print head (liquid ejection head) 1 including an ink supply member (liquid supply member) in this embodiment. The print head 1 of this example is provided in a carriage of a so-called serial scan-type inkjet print apparatus (liquid ejection apparatus). The print head 1 also may be configured so as to be included in a so-called full line-type inkjet print apparatus.

The print head 1 of this example for ejecting various types of liquids such as ink includes an ink supply member (housing) 2, a printing element unit 3, and an electric connection substrate 5. The ink (liquid) is supplied to the printing element unit 3 from a not-shown ink tank (liquid container) through a connection unit 4 of the ink supply member 2 and an ink supply path in the ink supply member 2 (liquid supply path). In the printing element unit 3, a plurality of ejection openings that can eject ink are arranged so as to form a not-shown ejection opening array. For each ejection opening, an ejection energy generation element such as an electrothermal transducing element (heater) or a piezo element is provided. In this example, six connection portions 4 supply inks of the total of six colors and these inks are ejected from the ejection opening array corresponding to them. Thus, the ink supply member 2 includes ink supply paths providing the communication between the six connection portions 4 and the ejection arrays corresponding to them. The ejection opening arrays are arranged at an interval smaller than an interval at which the six connection portions corresponding to them are arranged. The ink flow paths corresponding to the six connection portions include the one having a bent shape. A not-shown print apparatus is used to drive the ejection energy generation element through an electric connection substrate 5 to thereby eject ink through the ejection opening corresponding to it.

Figure 2B:
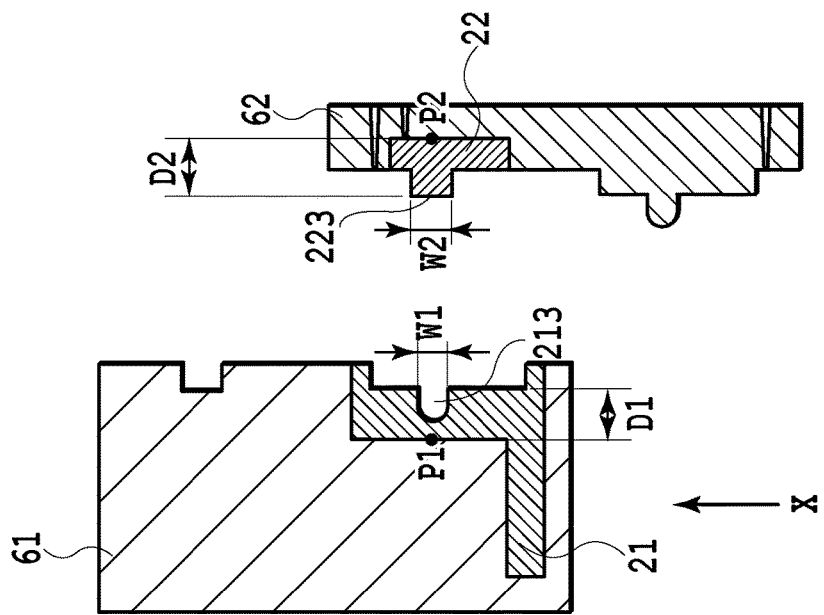
FIG. 2A and FIG. 2B are schematic cross-sectional views of the main part illustrating the print head of FIG. 1A in a manufacture stage, respectively.
Figure 2A:
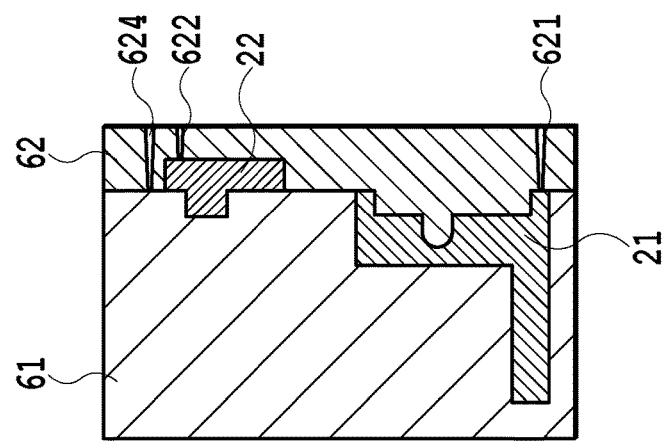
Figure 4A:
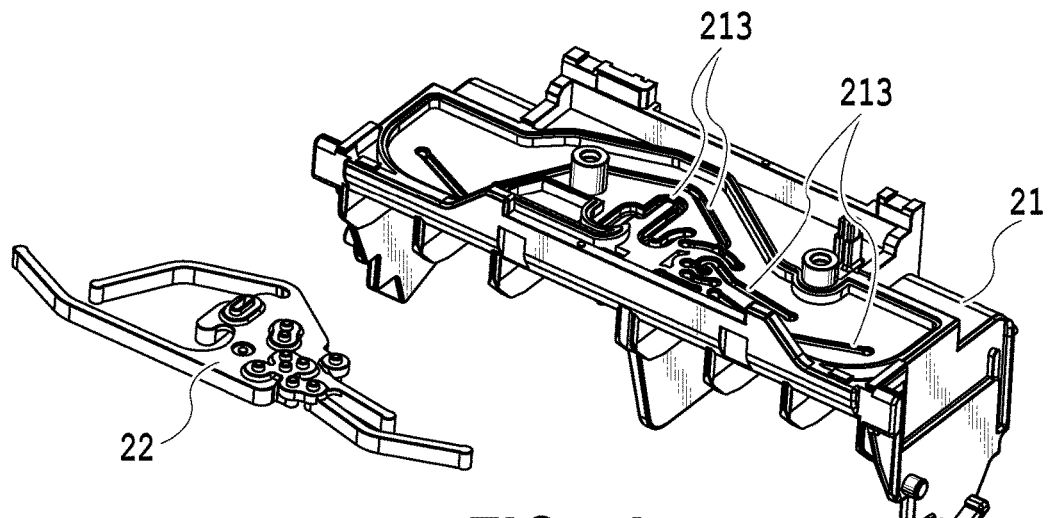
FIG. 4A and FIG. 4B are schematic cross-sectional views of the main part illustrating the first and second constituting components of the print head of FIG. 1A in the manufacture stage, respectively.
Figure 4B:
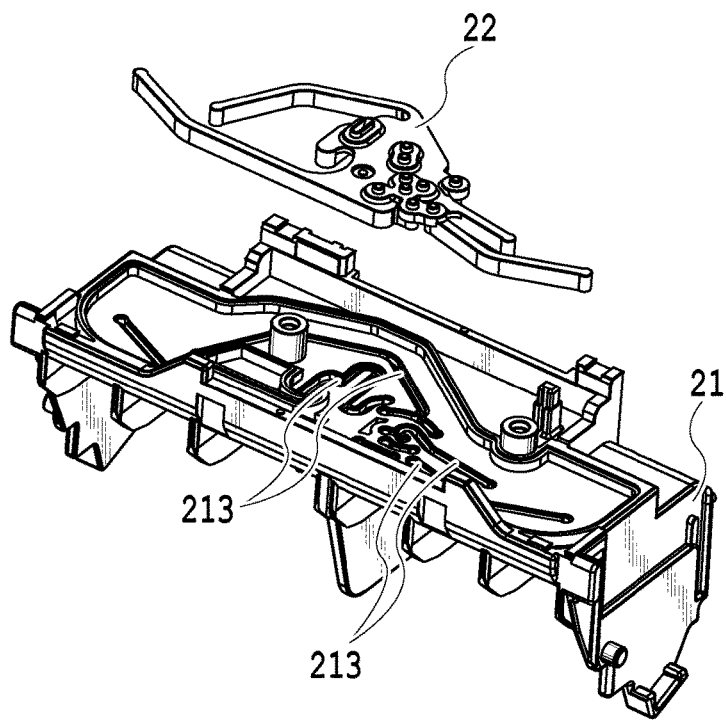
Figure 5A:
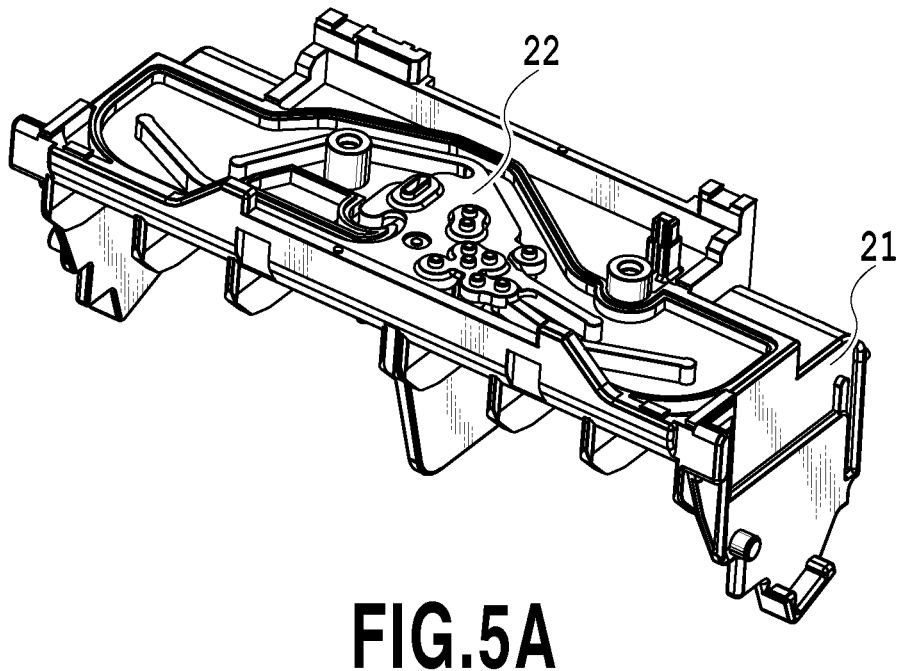
FIG. 5A and FIG. 5B are perspective views illustrating the first and second constituting components of the print head of FIG. 1A in the manufacture stage, respectively.
Figure 5B:
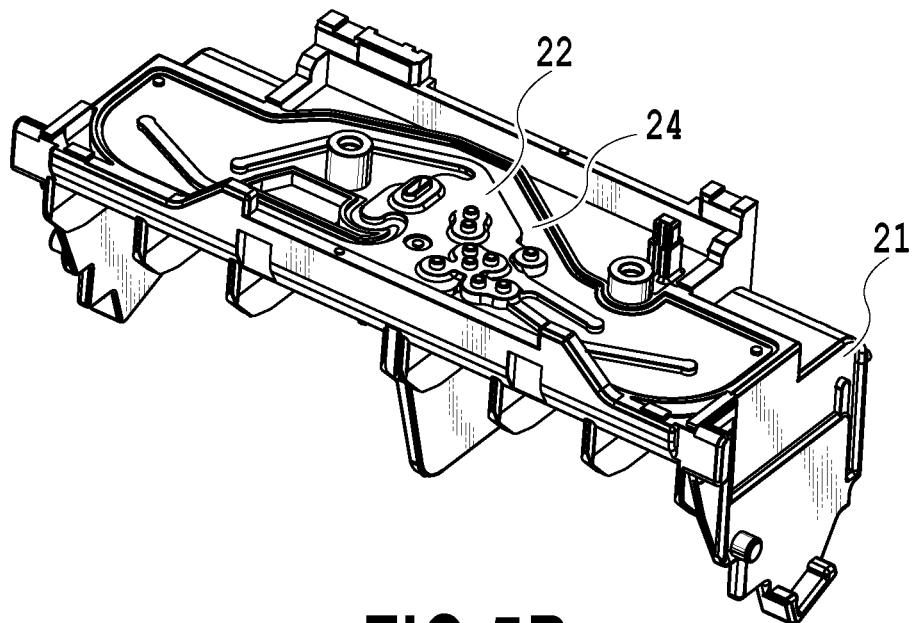

FIG. 2A to FIG. 5B illustrate the manufacture method of the ink supply member. As the manufacture method thereof, a manufacture method (die slide injection molding) is basically used. FIG. 2A and FIG. 2B are schematic cross-sectional views illustrating molds and molding components in first and second steps in a manufacture step. FIG. 3A and FIG. 3B are schematic cross-sectional views illustrating the molds and the molding components in third and fourth steps. FIG. 3C is a cross-sectional view illustrating an ink supply member taken out from the molds. FIG. 4A and FIG. 4B illustrate the positional relation of molding components in the first and second steps. FIG. 5A and FIG. 5B illustrate the positional relation of the molding components in the third and fourth steps. FIG. 6A, FIG. 6B, FIG. 6C, and FIG. 6D illustrate the positional relation of the main parts of the molding components in the first, second, third, and fourth steps, respectively.

In the first step, as shown in FIG. 2A, first and second constituting components (molding components) 21 and 22 constituting the ink supply member 2 are injection-molded by resin material in a pair of molds 61 and 62. The first constituting component 21 is molded between a first position of the mold (first mold) 61 and a first position of the mold (second mold) 62. The second constituting component 22 is molded between a second position of the mold 61 and a second position of the mold 62. The resin material for molding them is supplied through gates 621 and 622 provided in the mold 62. The mold 61 can be slid in a direction of an arrow X. A not-shown moving mechanism moves the molds 61 and 62 to each other in a mold clamp direction and a mold open direction that are a direction orthogonal to the arrow X. The mold 61 is moved in the direction of the arrow X and an opposite direction.

The first constituting component 21 includes a groove portion (ink supply path formation part) 213 forming a part of an ink supply path. The second constituting component 22 includes a cover portion 223 that forms the ink supply path together with the groove portion 213. The cover portion 223 is configured to have a width W2 wider than a width W1 of the groove portion 213 so as to block the entire opening part of the groove portion 213 (see FIG. 2B and FIG. 6A).

As shown in FIG. 1A, in a posture during the use of the print head 1 in which the printing element unit 3 is positioned at the lower side, the groove portion 213 and the cover portion 223 extend within a horizontal plane. Specifically, the ink supply path formed by the groove portion 213 and the cover portion 223 includes a part extending along the horizontal plane in the posture during the use of the print head 1. In FIG. 4A, the first constituting component 21 includes a plurality of the groove portions 213 for forming ink supply paths corresponding to the respective six types of inks. The second constituting component 22 includes not-shown cover portions 223 corresponding to these groove portions 213. In the posture during the use of the print head 1, the ink supply path extends in a vertical direction in the vicinity of the connection portion 4 and in the vicinity of a connecting portion with the printing element unit 3. A connecting part of the portion extending in the vertical direction and the portion extending in the horizontal plane has a bent part. In this example, as molding material of the first and second constituting components 21 and 22, the same resin material including fillers is used.

Figure 6A:
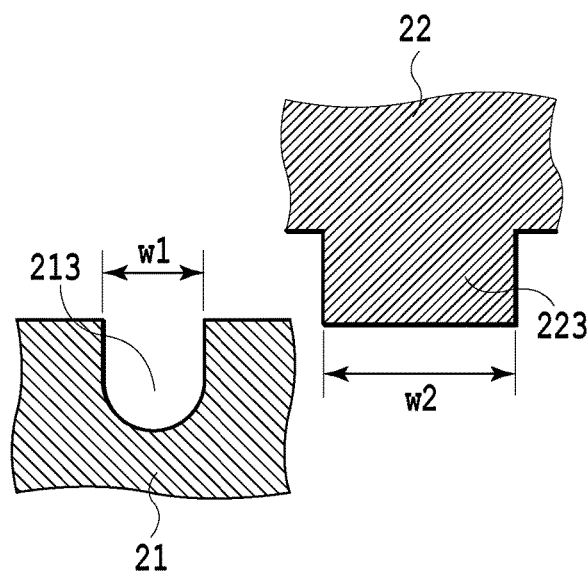
FIG. 6A, FIG. 6B, FIG. 6C, and FIG. 6D are schematic cross-sectional views of the main part illustrating the print head of FIG. 1A in the manufacture stage, respectively.
Figure 6B:
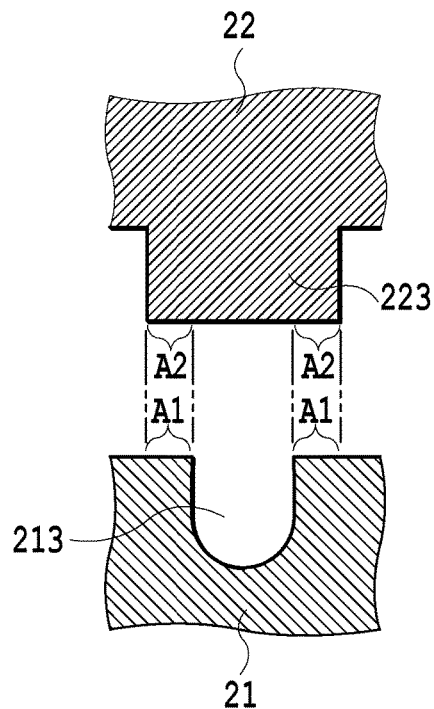

In the next second step, as shown in FIG. 2B, the molds 61 and 62 are opened and then the mold 61 retaining the first constituting component 21 is slide in the direction of the arrow X. As shown in FIG. 4B, the first constituting component 21 is opposed to the second constituting component 22 retained by the mold 62. As a result, as shown in FIG. 6B, a region (first region) A1 surrounding the groove portion 213 is opposed to a region (second region) A2 surrounding the groove portion 213 and extended outside the groove portion 213 in a width direction. Specifically, the regions A1 and A2 form the constituting components 21 and 22 by the molds 61 and 62 and are defined in a state in which the molds 61 and 62 are opened (a state before the molds 61 and 62 are mold-clamped again (second mold clamp)). The reference numeral A1 represents a region adjacent to the groove portion 213 that is abutted to the cover portion 223 during the second mold clamp. The reference numeral A2 represents a region of a tip end face of the cover portion 223 that is abutted to the constituting component 21 during the second mold clamp.

Figure 6C:
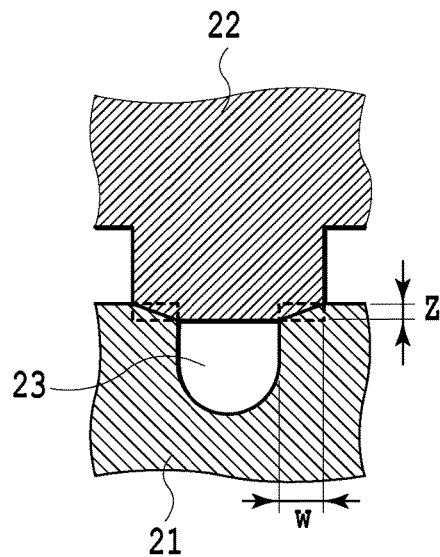

In the next third step, the molds 61 and 62 are again mold-clamped as shown in FIG. 3A to allow the regions A1 and A2 to be abutted to each other as shown in FIG. 6B and FIG. 6C. As a result, the ink supply path 23 is formed in the groove portion 213 closed by the regions A1 and A2.

Figure 6D:
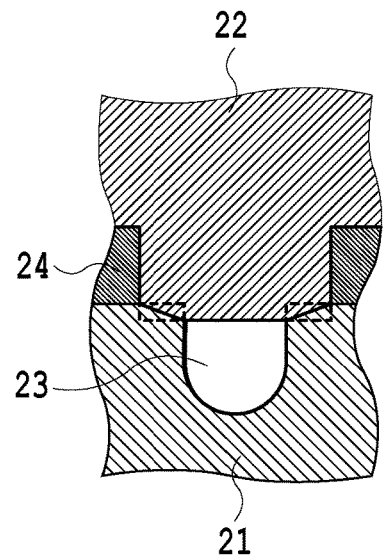

In the next fourth step, as shown in FIG. 3B and FIG. 6D, molten resin is allowed to flow into regions at the outer side of the regions A1 and A2 to thereby form a sealing member 24. The molten resin forming the sealing member 24 is supplied through the gate 624 provided in the mold 62. The compatibility of the resin allows the first constituting component 21 to be joined with the sealing member 24 and allows the second constituting component 22 to be joined with the sealing member 24 and they are integrated to constitute the ink supply member 2. During this, a part of the regions A1 and A2 also may be compatible by the heat of the molten resin. In this example, the molten resin is the same resin material as those of the first and second constituting components 21 and 22. The resin material forming the sealing member 24 may be the one compatible with the first and second constituting components 21 and 22 or may be the one different from that of these constituting components 21 and 22. The ink supply member 2 configured by the first and second constituting components 21 and 22 and the sealing member 24 is taken out from the molds 61 and 62 as shown in FIG. 3C.

Next, the following section will describe a relation of the regions A1 and A2.

A position P1 in FIG. 2B is positioned at an inner face (first face) of the mold 61. The mold 61 is abutted, at the position P1, to a face of the first constituting component 21 positioned at an opposite side of the surrounding region A1 in a mold clamp direction (direction orthogonal to the arrow X) in the drawing. In the mold clamp direction, a distance between a position of the region A1 and the position P1 is assumed as D1. A position P2 in FIG. 2B is positioned at an inner face of the mold 62 (second face). The mold 62 is abutted, at the position P2, to a face of the second constituting component 22 positioned at an opposite side of the surrounding region A2 in the mold clamp direction. In the mold clamp direction, a distance between a position of the region A2 and the position P2 is assumed as D2. As shown in FIG. 3A, a distance between the positions P1 and P2 in the mold clamp direction when the molds 61 and 62 are mold-closed is assumed as D3. These distances D1, D2, and D3 have a relation of the following formula (1).

$$D1+D2>D3 \quad (1)$$

As shown in FIG. 3A, the distance D3 is a distance defined depending on the shape of the ink supply member 2 (the shape of a part forming the ink supply path 23) and corresponds to the interval at which the inner faces of the molds 61 and are opposed during the mold clamp. The distance D1 corresponds to the shape of the part of the groove portion 213 in the first constituting component 21. The distance D2 corresponds to the shape of the cover portion 223 in the second constituting component 22. The sum of the distances D1 and D2 is set to be larger than the distance D3 defined depending on the shape of the ink supply member 2. Thus, when the third step is completed, as shown in FIG. 6C, the regions A2 are pushed into the regions A1 (or buried into the regions A1). Then, parts in the vicinity of the region A1 and region A2 may be shaped so that only one of the region A1 side or the region A2 side is deformed when compared with the shapes at the end of the second step or both of the region A1 side and the region A2 side are deformed when compared with the shapes at the end of the second step.

At the end of the second step, the surface of the first constituting component 21 mold-separated from the mold 62 and the surface of the second constituting component 22 mold-separated from the mold 61 have warpage in the entirety or a partial sink mark for example. This prevents the regions A1 and A2 from having a completely-flat surface. Thus, when the regions A1 and A2 are abutted so as to merely touch each other (in the case of D1+D2=D3), in the subsequent third step of FIG. 3A, the regions A1 and A2 as an abutted part thereof may partially include a gap. In such a case, as described above, in the subsequent fourth step of FIG. 3B, there is a risk where molten resin enters the ink supply path 23 through the gap.

In this example, as shown in FIG. 6C, the regions A2 can be pushed into the regions A1 to thereby allow the regions A1 to be securely abutted to the regions A2, thereby suppressing the molten resin from entering the ink supply path 23. The regions A2 are pushed into the regions A1 by a relative pushing amount Z approximately set to an amount that can absorb the variation in the flatness of the regions A1 and A2 at the completion of the second step. When the pushing amount Z is excessively high on the other hand, the groove portion 213 and the cover portion 223 are significantly deformed, causing a risk where the shapes of the ink supply path 23 and the other parts are influenced. The pushing amount Z is desirably 0.03 mm or more and 0.2 mm or less.

When parts at which the regions A1 and A2 are abutted to each other have a width W (FIG. 6C) to which the pushing amount Z is excessively high, and when the molds 61 and 62 are mold-clamped, the shapes of the abutted parts are broken, thereby causing a risk where the abutted parts include a gap or the ink supply path 23 includes a part having a different shape. When the abutted parts have an excessively-small width W and when the compatibility is provided due the heat of the molten resin, the shapes of the ends of the groove portion 213 and the cover portion 223 are broken, causing a risk where the molten resin flows through the broken part into the ink supply path 23. When these abutted parts have an excessively-wide width W on the other hand, the mold clamping forces of the molds 61 and 62 are dispersed at these abutted parts, thereby causing a risk where they are insufficiently pushed relative to each other and a part including a sink mark cannot be completely abutted. From the viewpoint as described above, the relation between the pushing amount Z and the width W of the abutted part is desirably set so that W/Z is within a range of 1 to 30. Specifically, the relation is desirably set so as to satisfy a relation of the following formula (2).

$$1 \leq W/(D1+D2-D3) \leq 30 \quad (2)$$

In the ink supply member 2 of the print head 1, as described above, the plurality of ink supply paths 23 are densely formed. Thus, in the fourth step of FIG. 3B, the molten resin forming the sealing member 24 tends to be injected at a higher pressure. Furthermore, since the ink supply path 23 is minute, if the molten resin forming the sealing member 24 enters the ink supply path 23, the ink supply may be hindered with a high probability. From these viewpoints, in the ink supply member 2 of the print head 1, the relation is more preferably set so that W/Z is within a range of 1.5 to 20. Specifically, the relation is desirably set so as to satisfy a relation of the following formula (3).

$$1.5 \leq W/(D1+D2-D3) \leq 20 \quad (3)$$

Figure 7A:
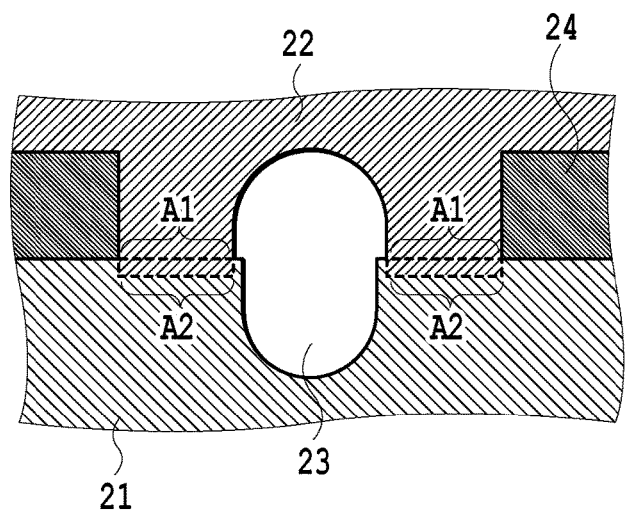
FIG. 7A and FIG. 7B are schematic cross-sectional views of the main part for explaining another configuration example of the print head of FIG. 1A in the manufacture stage, respectively.

The abutted parts of the regions A1 and A2 desirably have, as shown in FIG. 6A to FIG. 6D, corners (ridge lines) of the groove portion 213 and the cover portion 223. In the present invention, in a cross section orthogonal to the direction along which the ink supply path 23 extends as shown in FIG. 7A, only any one of the regions A1 and A2 has a plane and does not have to have a corner. However, in the case of FIG. 7A, the region A2 of the second constituting component 22 must have a sufficiently-wide width so that the region A2 is prevented from being fallen due to the pressure of the molten resin forming the sealing member 24, thus consequently increasing the widths of the abutted parts of the regions A1 and A2. At these abutted parts, in a part in the vicinity of the sealing member 24, the stress caused when the regions A1 and A2 are collapsed is reduced due to the heat of the molten resin. However, the heat is suppressed from being transmitted in a part away from the sealing member 24, thus causing the stress to remain therein. Thus, a configuration as shown in FIG. 6A to FIG. 6D is preferred in which the groove portion 213 and the corner of the cover portion 223 are positioned at the abutted parts of the regions A1 and A2 to reduce the width of the abutted parts of the regions A1 and A2.

Figure 7B:
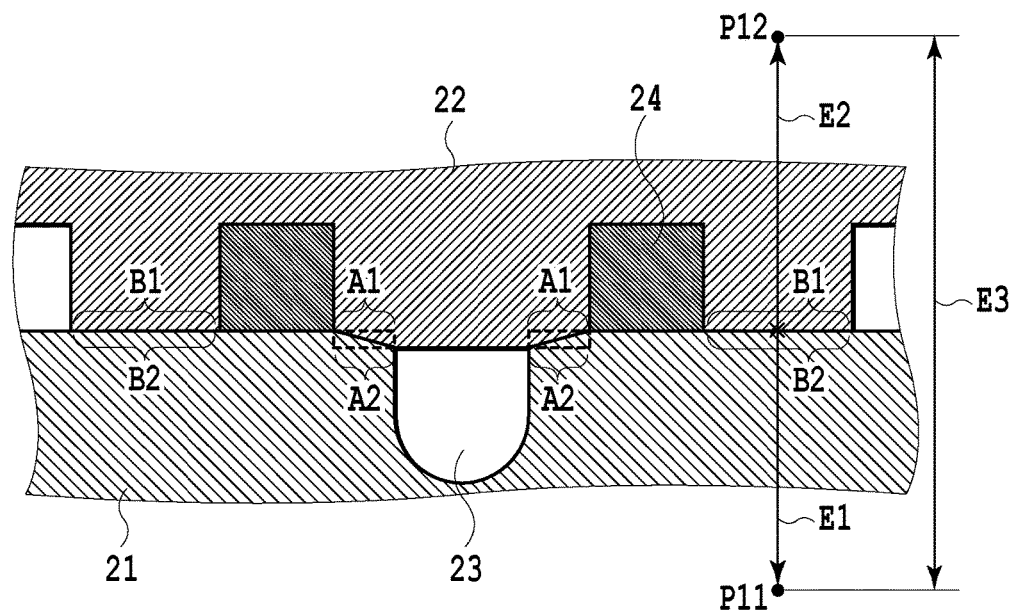

In this example, as shown in FIG. 3A to FIG. 3C, a shape of the sealing member 24 (shape of a flow path in which molten resin flows) is defined by the first constituting component 21, the second constituting component 22, and the molds 61 and 62. However, a configuration as shown in FIG. 7B also may be used in which the shape of the sealing member 24 is defined only by the first constituting component 21 and the second constituting component 22. In this case, the abutted parts of the regions A1 and A2 positioned along the ink supply path 23 have parts pushed into each other as in the above-described example. On the other hand, abutted parts of a region (third region) B1 and a region (fourth region) B2 defining the outer side of the molten resin may not have to have such parts pushed into each other. As described above, by pushing the abutted parts of the regions A1 and A2 to each other, the molten resin can be more securely suppressed from entering the ink supply path 23. Furthermore, the abutted parts of the regions B1 and B2 may be pushed to each other by a pushing amount smaller than a pushing amount at which the regions A1 and A2 are pushed to each other.

Specifically, in FIG. 7B, a distance between the region B1 and a position P11 of the face of the mold 61 (third face) abutted to a region at an opposite side of the region B1 in the first constituting component 21 is assumed as E1. A distance between the region B2 and a position P12 of the second mold face (fourth face) abutted to a region at an opposite side of the region B2 in the second constituting component 22 is assumed as E2. A distance between the positions P11 and P12 when the molds 61 and 62 are closed is assumed as E3. These distances E1, E2, and E3 and the above-described distances D1, D2, and D3 have therebetween a relation of the following formula (4).

$$D1+D2-D3>E1+E2-E3 \qquad (4)$$

In this example, the first constituting component 21-side part of the ink supply path 23 is connected to the ink tank (liquid container). The second constituting component 22-side part of the ink supply path 23 is connected to the printing element unit 3. However, contrary to this, another configuration may be used in which the former part is connected to the printing element unit 3 and the latter part is connected to the ink tank. Another configuration also may be used in which the first constituting component 21 includes the cover portion 223 and the second constituting component 22 includes the groove portion 213.

[Second Embodiment]

Figure 8A:
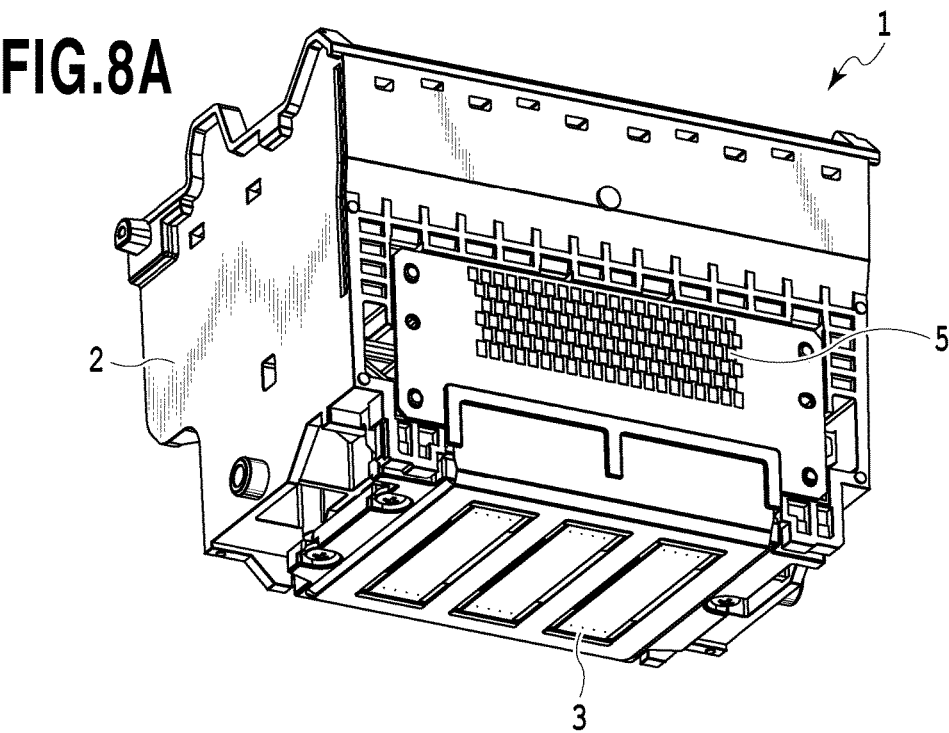
FIG. 8A and FIG. 8B are perspective views illustrating the print head in the second embodiment of the present invention, respectively.
Figure 8B:
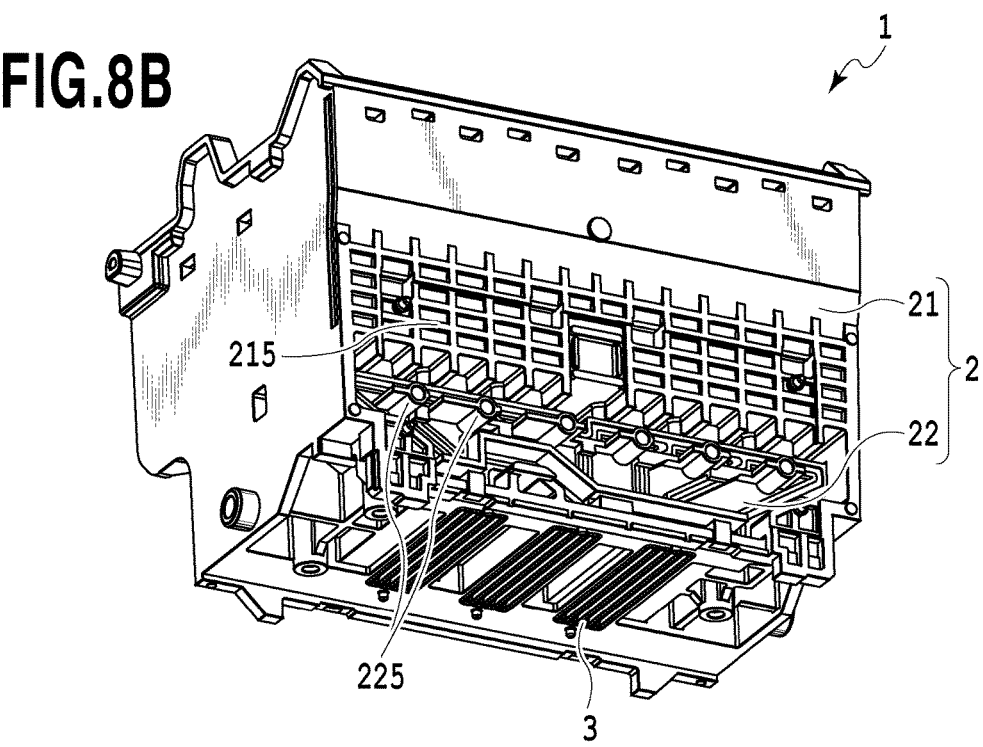
Figure 9:
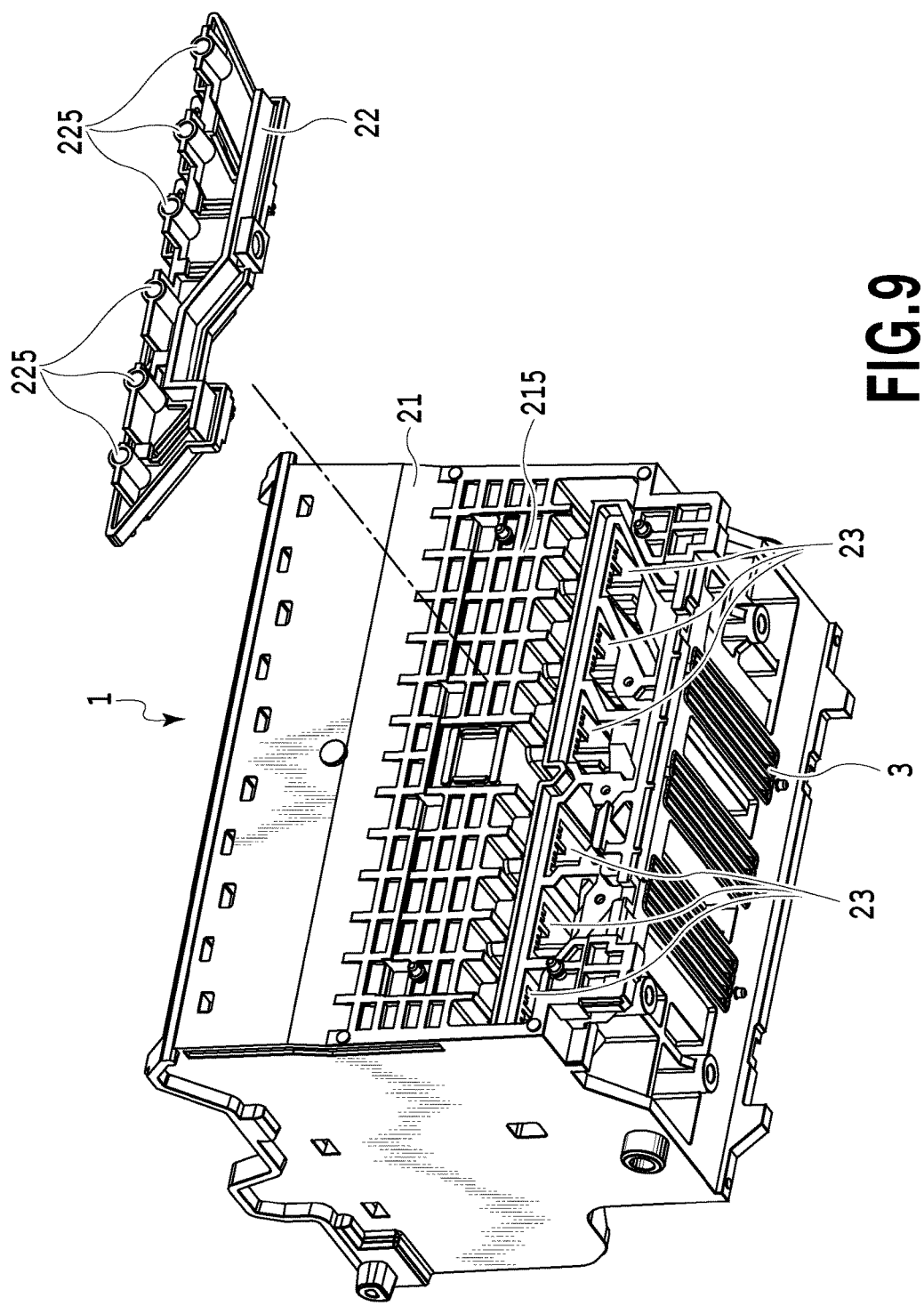
FIG. 9 is an exploded perspective view illustrating the print head of FIG. 8A.

FIG. 8A is a perspective view illustrating the print head 1 in the second embodiment of the present invention. Similarly to the above-described embodiment, the print head 1 includes the ink supply member (housing) 2, the printing element unit 3, and the electric connection substrate 5. The ink supply member 2 is constituted by the first and second constituting components 21 and 22 of FIG. 8B. FIG. 9 is an exploded perspective view illustrating the first and second constituting components 21 and 22. In this embodiment, the ink supply path 23 is bent within upper and lower vertical planes and is formed by the steps similar to that of the above-described embodiment. The width W and the pushing amount Z of the abutted parts of the regions A1 and A2 are set so that W/Z is within a range of 1 to 30 as in the above-described embodiment.

In this example, as a face receiving the electric connection substrate 5 positioned at a fixed position, a receiving face 215 is formed in the first constituting component 21 and a receiving face 225 is formed in the second constituting component 22. These receiving faces 215 and 225 are positioned on the same flat surface and position thereon an electric connection substrate 5.

Generally, when two components are joined by adhesion or welding for example, the components are influence by the size variation or joint accuracy of these two components. Thus, when the third component is placed so as to be positioned on these two components, one of the two components generally has a face including a receiving face abutted to the third component and a face of the other component is generally retracted to a position free from the interference with the third component. During the use of the electric connection substrate 5, the substrate 5 receives a load due to the connection to the print apparatus-side contact point. Thus, a risk is caused where a part at which a back face is not received by a face of the other component is deformed, which causes unstable electric connection.

In contrast with this, in this example, as described above, the positional relation between the first and second constituting components 22 and 23 can be set with a high accuracy to improve the dimensional accuracy of the ink supply member 2. Thus, the receiving face 215 at the first constituting component 22 and the receiving face 225 at the first constituting component 22 can be accurately positioned relative to each other, thus eliminating the need to retract one of the first and second constituting components 22 and 23 from the electric connection substrate 5. Thus, the receiving faces 215 and 225 of the first and second constituting components 22 and 23 can have thereon the electric connection substrate 5, thereby suppressing the deformation of the electric connection substrate 5. As described above, while the shape of the ink supply path 23 through which stable ink supply can be provided is being secured, the outer dimension of the ink supply member 2 can be accurately set, thus reducing the limitation on the layout of components such as the electric connection substrate 5. This can consequently provide the cost reduction by the size reduction of the first and second constituting components 22 and 23, the size reduction of the ink supply member 2, and the size reduction of the print head 1. Furthermore, the first and second constituting components and the sealing member 24 can be formed by the same resin material, which is also preferred from the viewpoint of the relation with ink (wetting property). Furthermore, when the former and the latter are formed by the same resin material, the respective parts have substantially the same linear expansion coefficient. This can consequently reduce the influence by the expansion or contraction of the respective parts due to a temperature change.

[Other Embodiments]

The present invention is not limited to the manufacture of an ink supply member provided in an inkjet print head. The invention can be applied to the manufacture of a liquid supply member including various liquid supply paths.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105103, filed May 25, 2015, and Patent Application No. 2016-061821, filed Mar. 25, 2016 which are hereby incorporated by reference wherein in its entirety.

What is claimed is:

1. A manufacture method of a liquid supply member configured by a plurality of constituting components including first and second constituting components for forming a liquid supply path between the first constituting component and the second constituting component, comprising:

a first step of injection-molding the first constituting component between a first position of a first mold and a first position of a second mold and injection-molding the second constituting component between a second position of the first mold and a second position of the second mold;

a second step of opening the first mold and the second mold so that the first position of the first mold has the first constituting component and the second position of the second mold has the second constituting component to subsequently move the first mold relative to the second mold so that the first constituting component is opposed to the second constituting component;

a third step of closing the first mold and the second mold so that a first region surrounding a part in which the liquid supply path is formed in the first constituting component and a second region surrounding a part in which the liquid supply path is formed in the second constituting component are abutted to each other; and a fourth step of allowing molten resin to flow to an outer side of the first and second regions, wherein in the third step, one of the first region and the second region is pushed to the other when the first mold and the second mold are closed, and wherein: D1+D2>D3, where, in a state prior to the closing of the first mold and the second mold in the third step, D1 is a distance between the first region and a first face of the first mold abutted to a region at an opposite face of the first region in the first constituting component, and D2 is a distance between the second region and a second face of the second mold abutted to a region at an opposite side of the second region in the second constituting component, and where, in a state where the first mold and the second mold are closed in the third step, D3 is a distance between the first face and the second face.

2. The manufacture method of the liquid supply member according to claim 1, wherein in the third step, $$1 \leq W/(D1+D2-D3) \leq 30,$$

where W is a width of an abutted part of the first and second regions in a width direction of the liquid supply path.

3. The manufacture method of the liquid supply member according to claim 1, wherein in the third step, $$1.5 \leq W/(D1+D2-D3) \leq 20,$$

where W is a width of an abutted part of the first and second regions in a width direction of the liquid supply path.

4. The manufacture method of the liquid supply member according to claim 1, wherein at least one of the first region and the second region includes a corner positioned at an abutted part of the first and second regions.

5. The manufacture method of the liquid supply member according to claim 1, wherein the first constituting component and the second constituting component respectively include a third region and a fourth region abutted to each other so as to define, when the first mold and the second mold are closed in the third step, an outer shape of the molten resin flown in the fourth step.

6. The manufacture method of the liquid supply member according to claim 1, wherein the first constituting component and the second constituting component respectively include a third region and a fourth region abutted to each other so as to define, when the first mold and the second mold are closed in the third step, an outer shape of the molten resin flown in the fourth step, and wherein: D1+D2−D3>E1+E2−E3, where, in a state prior to the closing of the first mold and the second mold in the third step, E1 is a distance between the third region and a third face of the first mold abutted to a region at an opposite side of the third region in the first constituting component, and E2 is a distance between the fourth region and a fourth face of the second mold abutted to a region at an opposite side of the fourth region in the second constituting component, and where, in a state where the first mold and the second mold are closed in the third step, E3 is a distance between the third face and the fourth face.

7. The manufacture method of the liquid supply member according to claim 1, wherein the plurality of constituting components includes a third constituting component, and wherein the third constituting component is attached to be abutted to a first receiving face formed on the first constituting component and a second receiving face formed on the second constituting component, respectively.

8. A manufacture apparatus of a liquid supply member configured by a plurality of constituting components including first and second constituting components for forming a liquid supply path between the first constituting component and the second constituting component, comprising:

a first mold and a second mold;

a molding unit of injection-molding the first constituting component between a first position of the first mold and a first position of the second mold and injection-molding the second constituting component between a second position of the first mold and a second position of the second mold;

a moving unit of opening the first mold and the second mold so that the first position of the first mold has the first constituting component and the second position of the second mold has the second constituting component to subsequently move the first mold relative to the second mold so that the first constituting component is opposed to the second constituting component;

a mold-closing unit of closing the first mold and the second mold so that a first region surrounding a part in which the liquid supply path is formed in the first constituting component and a second region surrounding a part in which the liquid supply path is formed in the second constituting component are abutted to each other; and a unit of allowing molten resin to flow to the outer side of the first and second regions, wherein the mold-closing unit pushes one of the first region and the second region to the other when the first mold and the second mold are closed, and wherein the molding unit injection-molds the first and second constituting components so that a relationship D1+D2>D3 is established, where, in a state after the first and second constituting components are injection-molded and before the first and second molds are closed, D1 is a distance between the first region and a first face of the first mold abutted to a region at an opposite side of the first region in the first constituting component, and D2 is a distance between the second region and a second face of the second mold abutted to a region at an opposite side of the second region in the second constituting component, and where, in a state after the first and second constituting components are injection-molded and while the first and second molds are being closed, D3 is a distance between the first face and the second face in a direction along which the first mold and the second mold are closed.

9. A manufacture method of a liquid supply member configured by a plurality of constituting components including first and second constituting components for forming a liquid supply path between the first constituting component and the second constituting component, comprising:

a step of using a pair of a first mold and a second mold to injection-mold the first and second constituting components to subsequently move the first and second molds relative to each other so as to be opposed to the first and second constituting components and closing the first mold and the second mold so that a first region surrounding a part at which the liquid supply path is formed in the first constituting component is abutted to a second region surrounding a part at which the liquid supply path is formed in the second constituting component to subsequently allow molten resin to flow to outer sides of the first and second regions to join the first and second constituting components, wherein when the first and second molds are closed, one of the first region and the second region is pushed into the other, and wherein: $D1+D2>D3$, where, in a state before the first and second molds are closed, D1 is a distance between the first region and a first face of the first mold abutted to a region at an opposite side of the first region in the first constituting component, and D2 is a distance between the second region and a second face of the second mold abutted to a region at an opposite side of the second region in the second constituting component, and where, in a state the first and second molds are closed, D3 is a distance between the first face and the second face.

* * * * *